March 27, 1934.                L. RICHARDSON                1,952,285
                                 WATER GAUGE
                              Filed Aug. 19, 1931
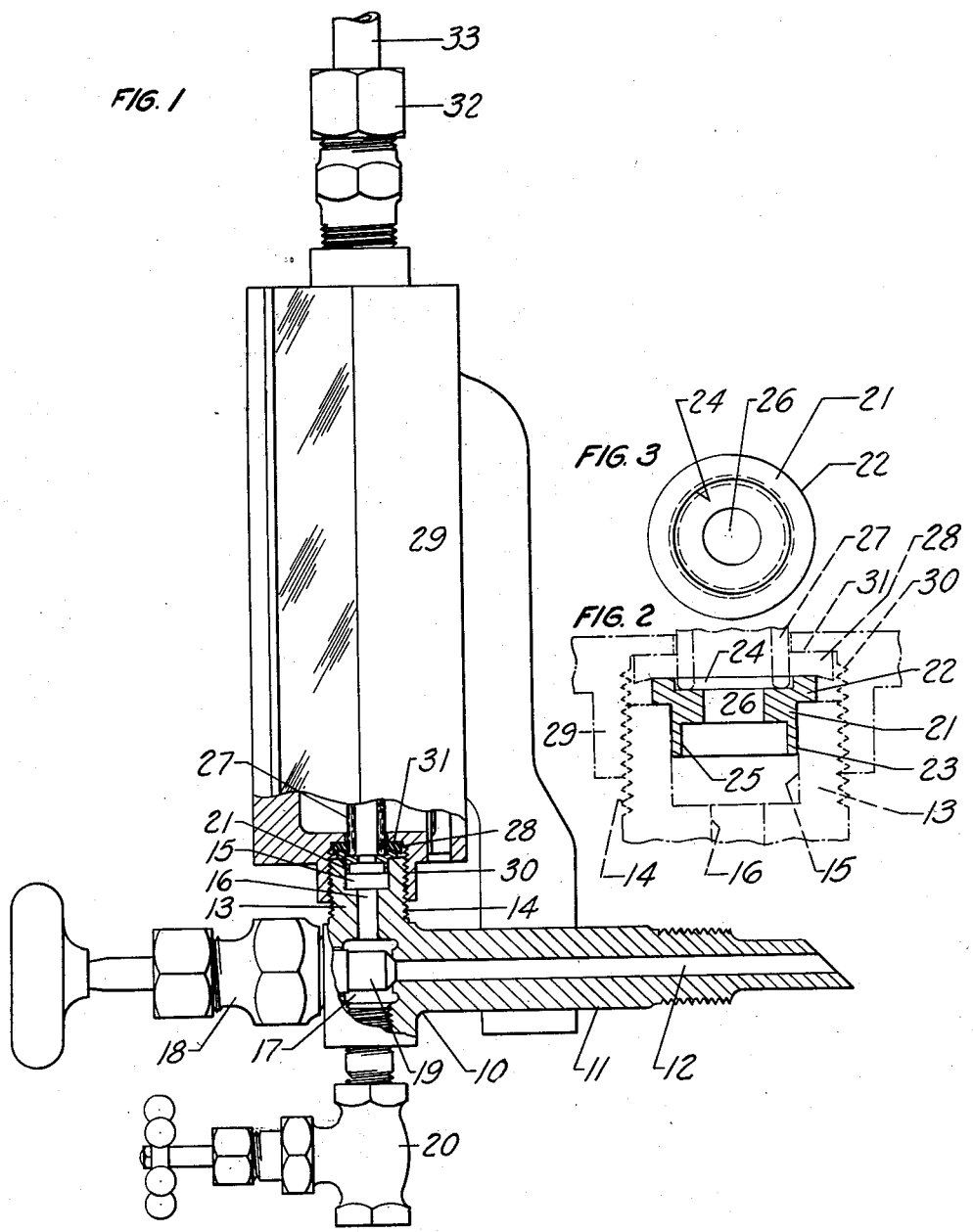
LAWRENCE RICHARDSON
INVENTOR
BY Walter E. Wollheim
ATTORNEY Patented Mar. 27, 1934

1,952,285

UNITED STATES PATENT OFFICE 1,952,285

WATER GAUGE

Lawrence Richardson, Melrose, Mass.

Application August 19, 1931, Serial No. 558,041

1 Claim. (Cl. 73—54)

This invention relates to improvements in water gauges used on steam boilers particularly of the portable or locomotive type. In a gauge of this kind, considerable wear takes place at the lower end of the glass forming part thereof causing breakages that may be injurious to the attendant and necessitate frequent removals thus increasing the cost of maintenance. The wear on the lower end of the glass is due principally to the surging action of the water in the glass caused by the swaying of the locomotive or other portable apparatus of which the boiler is a component part.

It is the principal object of this invention to minimize the wear at the lower end of the glass of a gauge by providing at its bottom a thimble which serves as a socket for the bottom of the glass and by means of which the water is projected into the glass in form of a contracted stream, somewhat smaller in diameter than the inside of the glass, thus eliminating the wear on the glass and greatly lengthening its service life.

Other objects will become apparent in the following specification and the accompanying drawing in which a preferred embodiment of the invention is shown.

In the drawing:

Fig. 1 is an elevational view partly in section of a fitting used to support the water glass upon the boiler;

Fig. 2 is an enlarged sectional view of the thimble at the lower end of the glass, the glass and other parts surrounding the thimble being shown in dotted lines; and Fig. 3 is a plan view of the thimble proper.

Like characters of reference denote similar parts throughout the several views and the following specification.

10 is a lower bracket of a typical water gauge used on locomotives, having a shank 11 adapted to be screwed into the backhead of the boiler. 12 is a bore through the shank 11 in communication with the water space of the boiler. 13 is an upwardly projecting extension at right angles to shank 11, exteriorly threaded at 14 and bored out interiorly at 15 to form a socket, and at 16 with a smaller diameter to connect the socket 15 with a central chamber 17 within the bracket 11. Substantially in alignment with the shank 11 is a valve structure 18 having a stem 19 adapted to reciprocate therein for the purpose of shutting off the bore 12 within the shank. 20 is a drain valve secured to the bottom of bracket 10 usually in juxtaposition to extension 13. All of these parts are of the customary construction used in high pressure locomotives and are to illustrate only a typical design to which my invention is applicable.

21 is a thimble of substantially cylindrical shape, having a collar 22 at its top and a smaller cylindrical portion 23 below it projecting into socket 15 of bracket 10, the bottom of the collar 22 resting upon the top of extension 13. The top of the collar 22 is recessed at 24 and so is the bottom of cylindrical portion 23 as shown at 25. 26 is a central bore through the thimble 21 connecting recesses 24 and 25 and forming sharp edges therewith.

27 is a tubular glass, its bottom resting in recess 24 of the thimble. A rubber gasket 28 surrounds the glass near its bottom and rests upon the top of the thimble. 29 is a water glass guard of conventional design surrounding the glass, tapped out at its bottom at 30, and having a flat shoulder 31 to press the gasket upon the thimble and also against the glass making a leakproof joint therewith.

32 is a union connection screwed into the top of guard 29 for connecting a pipe 33 to the steam space of the boiler which communicates with the glass 27 in the manner well known in the art.

Experience has shown that a tubular glass generally breaks at the bottom quarter, because it is there that most of the wear takes place due to sediment in the water. As stated above, the purpose of the thimble 21 is to prolong the life of the glass at this point. Each time the water recedes in the glass owing to the swaying action of the locomotive or the surging of the boiler, a head of water is built up at the front of the boiler and when the water returns due to this head of water, it passes through the sharp edged orifice 26 through thimble 21 issuing therefrom in form of a contracted stream which in its upward travel does not contact with the inner surface of the glass and falls gently when receding, thus greatly minimizing the wear on the glass.

It is particularly important that the passage 26 should have sharp edges at both inlet and outlet, because only when so made do I obtain a contracted stream of water for the purpose mentioned and am able to increase the service life of glasses to from 3 to 4 months. In fact I have found that by making the thimble itself of a metal such as "stainless steel" instead of bronze, the usual metal used for such purposes, I can still further increase the service life because with such metal the sharp edges of orifice 26 are maintained much longer.

I am aware of the fact that thimbles have been used at the top of glasses to deflect the condensate to the center line and not allow it to touch the sides of the glass, however, these thimbles do not prevent breakage or wear of the glasses at their bottom quarter where most of them break, and such thimbles are furthermore not made with straight sharp edged orifices or passages for the purpose specified but with tapering passages; if a thimble of this kind were applied to the bottom of the glass, it would cause a converging stream of water to enter the glass with a turbulent effect at the apex of this stream, thus annulling the object of the invention.

While I have described the details of the preferred embodiment of my invention, it is to be clearly understood that my invention is not limited to these details, but is capable of other adaptations and modifications in the scope of the appended claim.

What I claim as new, is:

In combination with the water gauge having a bottom fitting and a tubular glass supported thereupon, a thimble interposed between the bottom of the glass and the said fitting, and having an open unrestricted vertical passage throughout its length and a straight sharp-edged orifice smaller in diameter than the inside of the said glass and positioned immediately adjacent the bottom thereof to cause a contracted stream of water in the glass upon upward surge of the water.

LAWRENCE RICHARDSON.